United States Patent
Hidaka

(10) Patent No.: US 8,600,672 B2
(45) Date of Patent: Dec. 3, 2013

(54) TRAVEL ENERGY LEARNING DEVICE, AND METHOD

(75) Inventor: Tatsuya Hidaka, Okazaki (JP)

(73) Assignee: Aisin AW Co., Ltd., Anjo (JP)

( * ) Notice: Subject to any disclaimer, the term of this patent is extended or adjusted under 35 U.S.C. 154(b) by 644 days.

(21) Appl. No.: 12/385,448

(22) Filed: Apr. 8, 2009

(65) Prior Publication Data
US 2009/0299558 A1 Dec. 3, 2009

(30) Foreign Application Priority Data
May 27, 2008 (JP) .................................. 2008-138462

(51) Int. Cl.
*G01C 21/34* (2006.01)
*G06F 19/00* (2011.01)

(52) U.S. Cl.
CPC ............ *G01C 21/3469* (2013.01); *G01C 21/34* (2013.01); *G06F 19/00* (2013.01); *Y10S 903/903* (2013.01)
USPC .............................. 701/490; 701/22; 903/903

(58) Field of Classification Search
CPC .... G06F 19/00; G01C 21/34; G01C 21/3469; B60W 20/00
USPC ............. 701/22, 23, 25, 29, 35, 123, 490, 26, 701/34.1; 903/903; 711/133, 135, 159; 702/179, 187, 197
See application file for complete search history.

(56) References Cited

U.S. PATENT DOCUMENTS

| | | | |
|---|---|---|---|
| 5,650,931 A * | 7/1997 | Nii .................................. | 701/22 |
| 6,314,347 B1 | 11/2001 | Kuroda et al. | |
| 7,925,426 B2 * | 4/2011 | Koebler et al. ............... | 701/123 |
| 8,229,613 B2 * | 7/2012 | Kato et al. ...................... | 701/22 |
| 2007/0112475 A1 * | 5/2007 | Koebler et al. .................... | 701/1 |
| 2008/0119982 A1 | 5/2008 | Yamada | |
| 2009/0319110 A1 * | 12/2009 | Tani et al. ....................... | 701/22 |
| 2010/0121514 A1 * | 5/2010 | Kato et al. ...................... | 701/22 |
| 2011/0022255 A1 * | 1/2011 | Yamada et al. .................. | 701/22 |
| 2011/0029168 A1 * | 2/2011 | Talberg ........................... | 701/22 |
| 2011/0029184 A1 * | 2/2011 | Brighenti et al. ............... | 701/29 |
| 2011/0040438 A1 * | 2/2011 | Kluge et al. .................... | 701/29 |
| 2011/0060493 A1 * | 3/2011 | Miura et al. .................... | 701/29 |
| 2011/0130906 A1 * | 6/2011 | Mayer ............................. | 701/22 |
| 2011/0160946 A1 * | 6/2011 | Wilde et al. ..................... | 701/22 |
| 2011/0313647 A1 * | 12/2011 | Koebler et al. ............... | 701/123 |

FOREIGN PATENT DOCUMENTS

EP  1 832 483 A2  9/2007
JP  A-2000-333305  11/2000

OTHER PUBLICATIONS

Apr. 19, 2011 European Search Report issued in EP 09 00 5773.

* cited by examiner

Primary Examiner — John Q Nguyen
Assistant Examiner — Michael Whalen
(74) Attorney, Agent, or Firm — Oliff & Berridge, PLC

(57) ABSTRACT

A road section where the host vehicle is currently located is identified and the work rate of a transmission shaft, which transmits a driving force from a drive source of a host vehicle to a wheel, is derived based on a rotational speed and the torque transmitted by the transmission shaft. The energy required to travel through the road section is linked to the road section and accumulated based on the work rate derived while the host vehicle travels through the road section.

5 Claims, 7 Drawing Sheets

TRAVEL ENERGY LEARNING DEVICE, AND METHOD

INCORPORATION BY REFERENCE

The disclosure of Japanese Patent Application No. 2008-138462 filed on May 27, 2008 including the specification, drawings and abstract is incorporated herein by reference in its entirety.

BACKGROUND OF THE INVENTION

1. Field of the Invention

The present invention relates to a travel energy learning device, method, and computer-readable medium for a vehicle provided with a rechargeable battery.

2. Description of the Related Art

Conventionally, a usage schedule for an engine and a motor in a hybrid vehicle is set such that the amount of fuel consumed during travel on a route to a destination is minimized. Japanese Patent Application Publication No. JP-A-2000-333305 describes that, based on a driving history of a driver, road information specifying a route, vehicle information, and the like, an output energy value required to travel the route is calculated.

According to Japanese Patent Application Publication No. 2000-333305, the required output energy value is calculated based on the travel speed pattern (expressed as an average vehicle speed and average acceleration and deceleration in a section spanning from a departure point to a destination) and other information (such as rolling resistance, air resistance, acceleration resistance, and grade resistance). The accuracy of the calculated output energy value is dependent on the precision of the average vehicle speed, acceleration, deceleration, air density, road friction coefficient, gradient, etc., used in the calculation.

SUMMARY OF THE INVENTION

However, it is difficult to obtain precise and accurate parameters that are used in the calculation, and the calculation is complicated due to the many parameters involved. Therefore, it is difficult to accurately calculate the required output energy value. Accordingly, the present invention provides art that is capable of accurately calculating an output energy value required for traveling a road section.

A travel energy learning device according to a first aspect of the present invention includes: a road section identifying unit for identifying a road section in which the host vehicle is currently located; a work rate deriving unit for deriving the work rate of a transmission shaft, which transmits a driving force from a drive source of the host vehicle to a wheel, based on the rotational speed of the transmission shaft and the torque transmitted by the transmission shaft; and an energy information accumulating unit for deriving information that indicates an energy required for traveling the road section based on the derived work rate during travel of the host vehicle through the road section, linking the derived information that indicates the required energy with the road section, and accumulating such information. In other words, according to the first embodiment, the rotational speed and the torque of the transmission shaft are directly obtained from the transmission shaft, and the actual output work rate of the transmission shaft is derived from the rotational speed and the transmitted torque. In addition, the work rate of the transmission shaft is then used to derive the output energy value required by the host vehicle to travel through a particular road section. Therefore, the required output energy value needed to travel through the road section may be derived more accurately using a simple calculation compared to a configuration that calculates the required output energy value using a travel speed pattern, road grade, road friction coefficient, vehicle weight, air resistance, or the like.

A travel energy learning method according to a second aspect of the present invention includes, identifying a road section in which the host vehicle is currently located; deriving the work rate of a transmission shaft based on the rotational speed of the transmission shaft and the torque transmitted by the transmission shaft; and linking, on the basis of the information that indicates the work rate derived during travel of the host vehicle through the road section, information that indicates energy required for traveling the road section to the road section, and accumulates such information. In another aspect, the present invention may be embodied as a program that carries out such processing. Moreover, the travel energy learning device, method, and program, as described above, may be implemented in various embodiments, for example, as a stand-alone device, or as discrete parts used in common with certain components provided in the vehicle, or implemented through cooperation with components not provided in the vehicle. The present invention may also be modified as desired, such as by providing a portion of it in the form of software and a portion of it in the form of hardware, for example. The present invention may also be practiced in the form of a storage medium for a program that controls the travel energy learning device. Obviously, such a software storage medium may be a magnetic storage medium, and it may also be a magneto optical storage medium. Furthermore, any storage medium that is developed henceforth can also be considered to be exactly the same.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF THE EMBODIMENTS

Hereinafter, embodiments of the present invention will be described in the following order.
(1) Configuration of Travel Energy Learning Device
(2) Travel Energy Learning Processing
   (2-1) Energy Learning Processing
   (2-2) Energy Efficiency Derivation Processing
   (2-3) Learning Data Usage Processing
(3) Other Embodiments

(1) Configuration of Travel Energy Learning Device

Figure 1:
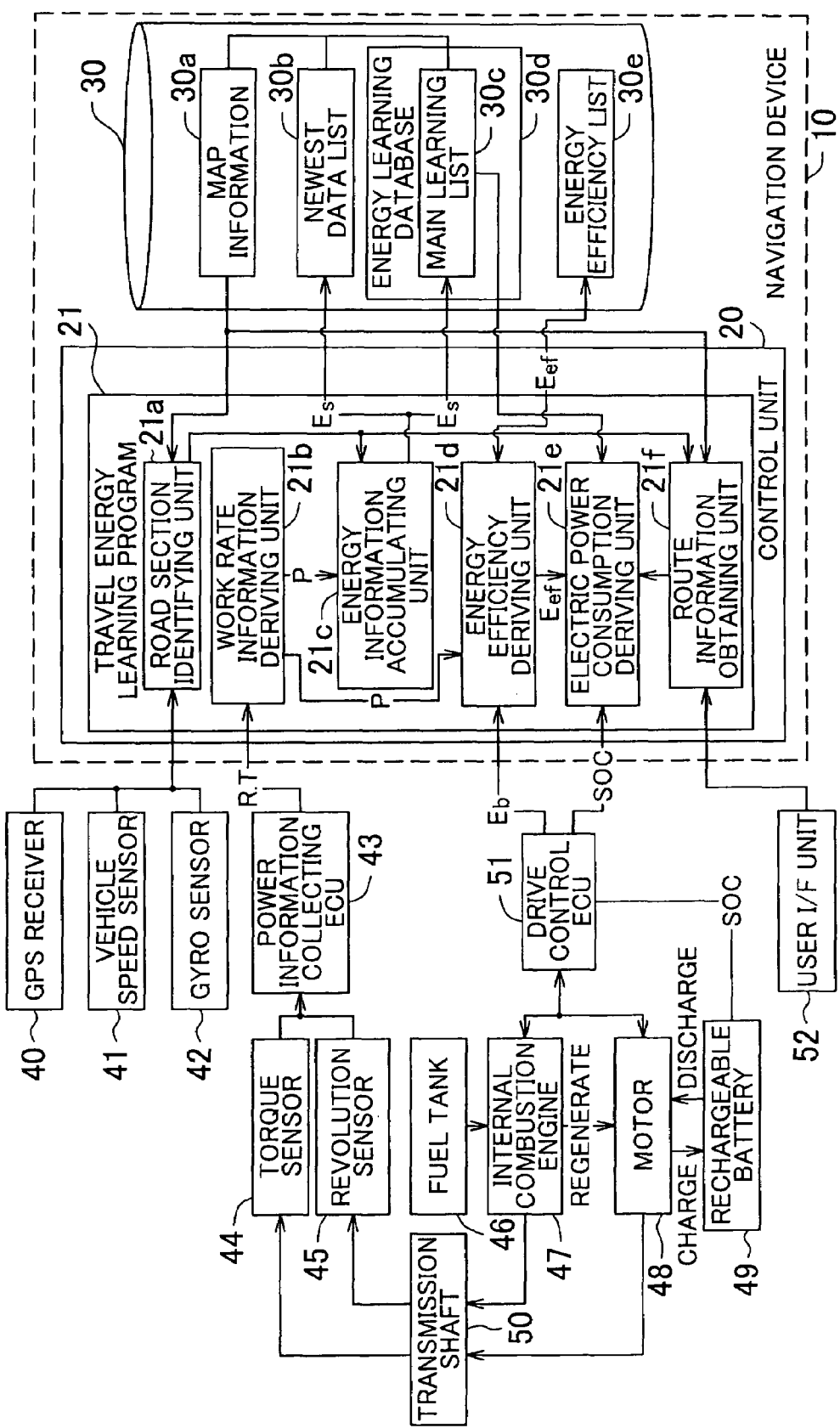
FIG. 1 is a block diagram showing a travel energy learning device.

FIG. 1 is a block diagram showing the configuration of a travel energy learning device installed in a vehicle. The travel energy learning device of the present embodiment is implemented by a navigation device 10. The navigation device 10 includes a control unit 20 that has a CPU, a RAM, a ROM, and the like, and a memory medium 30. The navigation device 10 executes programs accumulated in the memory medium 30 and the ROM using the control unit 20. In the present embodiment, a travel energy learning program 21 is one such program that may be executed by the control unit 20. To implement the learning function carried out by the travel energy learning program 21, the following parts (40 to 52) are provided in the host vehicle.

A GPS receiver 40 receives radio waves from a GPS satellite and outputs a signal for calculating the current position of the host vehicle and a signal that specifies current date and time to the control unit 20 via an interface (not shown). Thus, the control unit 20 obtains the current position of the host vehicle and the current date and time. A vehicle speed sensor 41 outputs a signal to the control unit 20 that indicates the rotational speed of a wheel provided in the host vehicle. The control unit 20 obtains the signal from vehicle speed sensor 41 via an interface (not shown) to obtain the speed of the host vehicle. A gyro sensor 42 detects the angular acceleration of the host vehicle when turning within a horizontal plane and outputs a signal that indicates the travel direction of the host vehicle to the control unit 20. The control unit 20 obtains this signal via an interface (not shown) to obtain the travel direction of the host vehicle. The vehicle speed sensor 41 and the gyro sensor 42 are used to correct the current position of the host vehicle as determined based on the output signal of the GPS receiver 40. The control unit 20 may correct the current position of the host vehicle as appropriate upon verification with map information 30a as described later.

The vehicle of the present embodiment is a hybrid vehicle provided with an internal combustion engine 47 and a motor 48 as drive sources. The internal combustion engine 47 generates a driving force using fuel accumulated in a fuel tank 46, and the motor 48 generates a driving force using electric power supplied from a rechargeable battery 49. The internal combustion engine 47 and the motor 48 are connected to a power transmission mechanism (not shown) that includes a transmission shaft 50, and the power transmission mechanism converts the rotational driving force from internal combustion engine 47 and the motor 48 into a vehicle propulsion force to drive the vehicle. The vehicle may be driven by either or both the internal combustion engine 47 and the motor 48. Furthermore, a portion of the rotational driving force generated by the internal combustion engine 47 may be transmitted to the motor 48 as regenerative energy, and the resulting electric power generated by the motor 48 is accumulated in the rechargeable battery 49.

The internal combustion engine 47 and the motor 48 are controlled by a drive control ECU 51. The drive control ECU 51 controls the internal combustion engine 47 and the motor 48 by outputting control signals to the internal combustion engine 47 and the motor 48 such that either or both the internal combustion engine 47 and the motor 48 generate a rotational driving force. Therefore, in the present embodiment, driving and stopping of the internal combustion engine 47, charging by the motor 48, and driving of the motor 48 through discharging of the rechargeable battery 49 are selectively performed depending on the control signal output by the drive control ECU 51. The drive control ECU 51 also obtains a remaining charge amount [%] (i.e., state of charge or SOC) from the rechargeable battery 49.

The transmission shaft 50 comprises part of the power transmission mechanism, which transmits driving force from the drive sources to the drive wheels (not shown). If the host vehicle is a front-engine rear-wheel-drive vehicle, for example, then a propeller shaft serves as the transmission shaft 50. A torque sensor 44 that detects a torque acting on the transmission shaft 50, and a rotational speed sensor 45 that detects a rotational speed of the transmission shaft 50 are provided in the present embodiment. A strain gauge may be adopted as the torque sensor 44. As for the strain gauge, a resistor (metal foil) is attached to the transmission shaft 50 via a thin insulator, and deformation of the transmission shaft 50 is accompanied by deformation of the resistor at the same rate. The torque is then be measured by converting the change in electrical resistance caused by such deformation into a change in voltage. In addition, conventional torque sensors such as a magnetostrictive, optical, or phase difference detection sensor may also be adopted. A power information collecting ECU 43 obtains a control signal that indicates the torque from the torque sensor 44 and also obtains a signal that indicates the rotational speed from the rotational speed sensor 45, and outputs the signals to the control unit 20.

The user interface unit 52 allows the input of a user's instructions and provides various information to the user. Although not shown, the user interface unit 52 may include a speaker, a touch panel display, switches, etc. By operating the interface unit 52, the user can set a destination for the navigation device 10.

When the travel energy learning program 21 is executed, the control unit 20 carries out energy learning, derives an energy efficiency, and predicts the electric power consumption. Accordingly, the travel energy learning program 21 is provided with a road section identifying unit 21a, a work rate information deriving unit 21b, an energy information accumulating unit 21c, an energy efficiency deriving unit 21d, an electric power consumption deriving unit 21e, and a route information obtaining unit 21f. Map information 30a is also accumulated in the memory medium 30. The map information 30a includes node data that indicates nodes set on roads; shape interpolating data that indicates the shape of the road between nodes; link data that indicates connections between nodes; gradient data indicating the road gradient; gradient change data indicating a point at which the road gradient changes; and data indicating objects present on or around a road. The map information 30a is used to identify a road section in which the host vehicle is currently located, perform a route search to a destination, perform route guidance to the destination, and the like.

In the control unit 20, the road section identifying unit 21a obtains the information that specifies the current position of the host vehicle and identifies the road section where the host vehicle is located. The term "road section" refers to a road section used as a unit to derive the energy required for traveling the road section in the energy information accumulating unit 21c, and may also be a predetermined section. In the present embodiment, the term corresponds to a road section divided by nodes, shape interpolating points, grade changes, and the like in the map information 30a. The road section may include road sections partitioned at arbitrary distance intervals, or a combination thereof. Any suitably determined road section may be used, provided that a start point and an end point, as well as the road therebetween may be uniquely identified. The control unit 20 obtains the output signals of the GPS receiver 40, various onboard sensors such as the vehicle speed sensor 41, and the gyro sensor 42, and obtains information specifying the current position of the host vehicle through the process executed by the road section identifying unit 21a. The control unit 20 then refers to the map information 30a to identify the road section that matches a projected trajectory of a position of the host vehicle.

In the control unit 20, the work rate deriving unit 21b derives the work rate of the transmission shaft 50 based on the torque and the rotational speed of the transmission shaft 50 (i.e., revolutions of the transmission shaft per unit time). In the present embodiment, the control unit 20 obtains via the power information collecting ECU 43 the rotational speed and the torque transmitted by the transmission shaft 50 per unit time, and then calculates the product of the rotational speed and the torque to determine the work rate. In a front-engine rear-wheel-drive vehicle, for example, a propeller shaft may serve as the transmission shaft; however, any transmission shaft capable of obtaining torque may be suitably employed as the transmission shaft. In a front-engine front-wheel-drive vehicle, the drive shaft may serve as the transmission shaft. The rotational speed of the transmission shaft may be detected using an electromagnetic rotational speed sensor, for example. Alternatively, a strain gauge, or a torque sensor such as a magnetostrictive, optical, or phase difference detection sensor, for example, may be used to detect the torque transmitted by the transmission shaft.

The energy information accumulating unit 21c in the control unit 20 derives the energy required for traveling the road section based on the aforementioned work rate value, linking information that indicates the derived required energy with the particular road section, and accumulating such information in the memory medium 30. Here, the energy required for traveling the road section may be derived, for example, by using the work rate calculated over the time required by the vehicle to travel from a start point of the road section to the endpoint of the road section. The time after the host vehicle passes the start point of the road section until the host vehicle passes the end point is also used to derive the energy required for traveling the road section.

Figure 2:
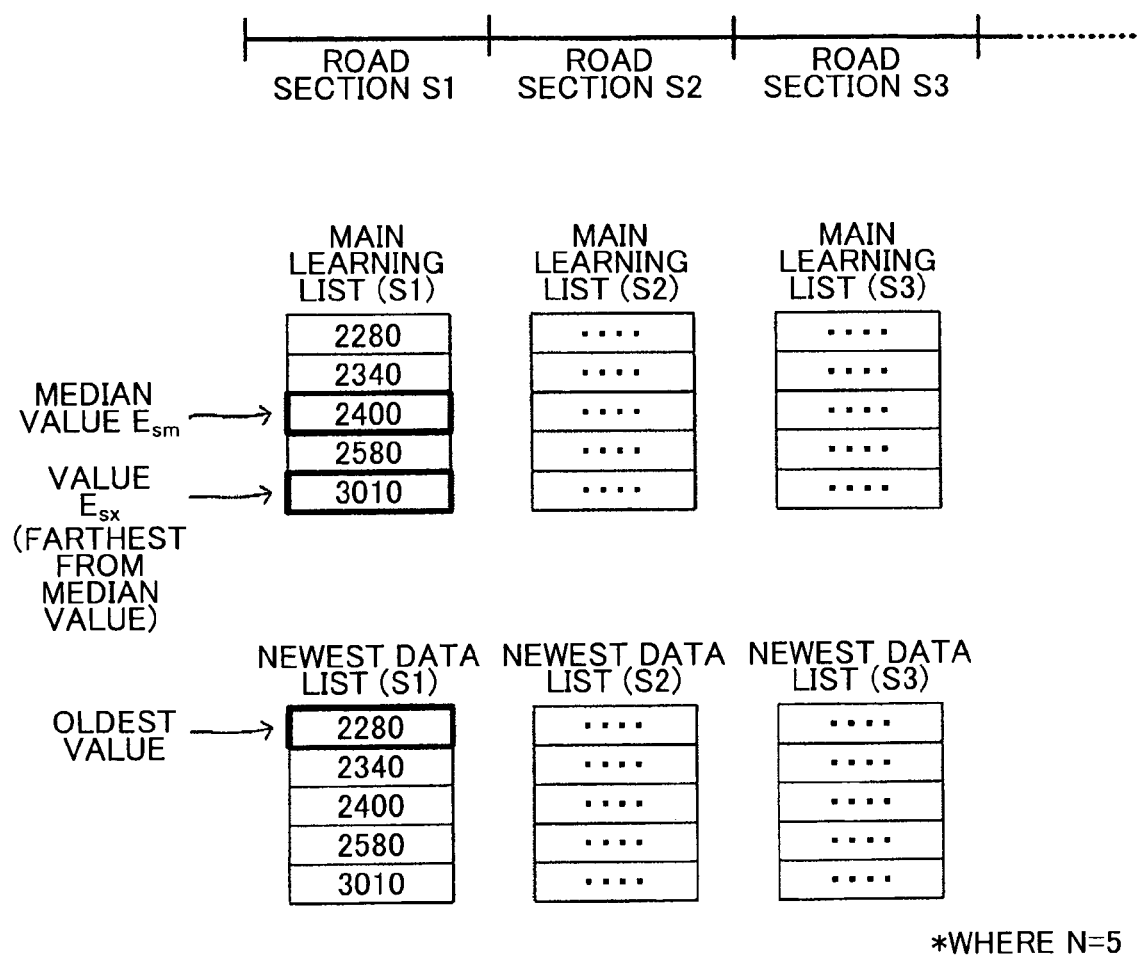
FIG. 2 is a figure for explaining a main learning list and a newest data list.

In the present embodiment, a main learning list 30c and a newest data list 30b are linked to arbitrary road sections for energy learning, and accumulated in the memory medium 30 (see FIG. 2). The main learning list 30c has data areas that accumulated an N quantity of energy values, and the newest data list 30b has data areas that similarly accumulate an N quantity of energy values. An energy learning database 30d of the present embodiment is configured to include main learning lists 30c, which are linked to respective road sections. In the main learning list 30c (a second accumulating unit), if an energy value is newly derived when an N quantity of energy values is already accumulated, then depending on the N quantity of energy values already accumulated it is determined whether to accumulate the newly derived energy value. Specifically, a median value $E_{sm}$ is selected from among the N quantity of energy values already accumulated, and an energy value $E_{sx}$, which has the largest absolute value in terms of a difference with the median value $E_{sm}$, is selected from an N−1 quantity of energy values, excluding the median value $E_{sm}$. Then, the absolute value of the difference between a newly derived energy value $E_s$ and the median value $E_{sm}$ is calculated. Next the absolute value of the difference between $E_{sm}$ and $E_{sx}$ ($|E_{sx}-E_{sm}|$) and the absolute value of the difference between $E_{sm}$ and $E_s$ ($|E_s-E_{sm}|$) are compared. If $|E_{sx}-E_{sm}|$ is larger than $|E_s-E_{sm}|$, then $E_{sx}$ is discarded and the newly derived energy value $E_s$ is added to the main learning list $30_c$. If $|E_{sx}-E_{sm}|$ is smaller than $|E_s-E_{sm}|$, then the main learning list 30c is not updated. The electric power consumption deriving unit 21e described later uses the median value among the 1 to N quantity of energy values accumulated in the main learning list 30c. Namely, according to the present embodiment, the derivation of sporadic largely different energy values will have hardly any effect. The newest data list 30b (a first accumulating unit) may be a FIFO type list wherein, if a newly derived energy value is accumulated when an N quantity of energy values is already accumulated, then the oldest accumulated energy value is discarded and the newly derived energy value is accumulated.

The energy efficiency deriving unit 21d of the control unit 20 derives the energy efficiency, which indicates a ratio of the energy output by the transmission shaft 50 with respect to the energy output from the motor 48 when the host vehicle is traveling using the driving force from the motor 48. For a hybrid vehicle, the energy efficiency deriving unit 21d derives the energy efficiency of the motor 48 when the combustion engine 47 is not used to drive the vehicle. Because the energy efficiency varies depending on various factors such as deterioration of the rechargeable battery, the driver's habits, and the usage condition of electric components such as the air conditioner, the energy efficiency is regularly updated. Furthermore, in the present embodiment, a plurality (an M quantity) of values that indicates energy efficiency derived within a predetermined time is accumulated in the memory medium 30 as an energy efficiency list 30e. The median value among the M quantity of values is employed by the electric power consumption deriving unit 21e to reduce the effects of noise.

The electric power consumption deriving unit 21e of the control unit 20 derives the electric power consumption of the motor 48, assuming that the host vehicle is traveling through the road section using the driving force generated by the motor 48, based on the energy efficiency and accumulated energy values associated with the particular road section. In other words, based on an energy efficiency $E_{ef}$ and the energy value $E_s$ ultimately to be output by the transmission shaft 50, an energy value $E_b$ to be output from the motor 48 is calculated backward. The energy value $E_b$ represents the amount of electric power that would be consumed by the host vehicle traveling through the applicable road section in EV mode alone. Naturally a value [%] in which the energy value $E_b$ is converted into a percentage, where the maximum charge of the rechargeable battery 49 is 100[%], may also be used as the electric power consumption. In addition, the electric power consumption deriving unit 21e derives the electric power consumption for each road section and the change in the remaining charge amount, based on the accumulated energy values linked to road sections that structure route information obtained by the route information obtaining unit 21f, described below, and based on the energy efficiency obtained by the energy efficiency deriving unit 21d.

The route information obtaining unit 21f of the control unit 20 obtains route information that specifies a route from a departure point to a destination. The departure point in the present embodiment is equivalent to the position of the host vehicle before the vehicle starts traveling. The control 20 obtains information that specifies the destination input to the interface unit 52 by the user, searches for a route from the current position of the host vehicle to the destination, and obtains route information that specifies the route.

(2) Travel Energy Learning Processing

Figure 3:
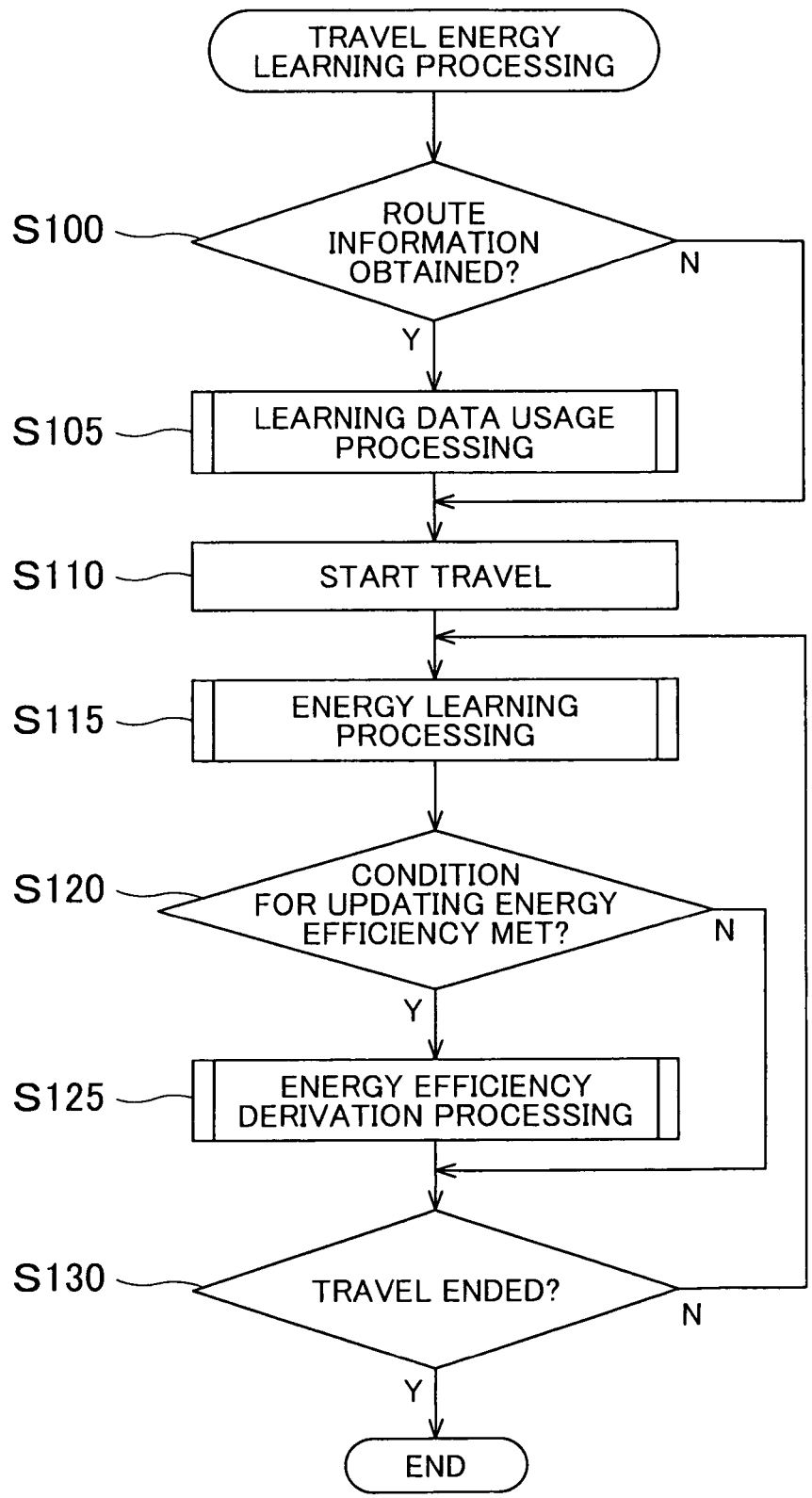
FIG. 3 is a flowchart showing travel energy learning process.

Next, the travel energy learning process that is executed by the navigation device 10 in the configuration described above will be explained. FIG. 3 is a flowchart showing the travel energy learning process. The control unit 20 first determines whether the route information is obtained (S100). If the route information has been obtained, then the control unit 20 executes learning data usage process (S105, FIG. 7). The control unit 20 next waits until the host vehicle starts traveling (S110). After detecting the start of travel, the control unit 20 executes the process from S115 to S125 at a predetermined intervals until it is determined that travel is ended at S130. In other words, while the vehicle is traveling, the control unit 20 executes the energy learning process (S115, FIG. 4), determines whether a condition for updating the energy efficiency is satisfied (S120), and executes the energy efficiency derivation process if it is determined that the condition for updating the energy efficiency is satisfied (S125, FIG. 6).

Note that the determinations regarding the start and end of travel at S110 and S130 may utilize, for example, a vehicle speed signal obtained from the vehicle speed sensor 41, or ignition on and off signals. The condition for updating the energy efficiency at S120 is satisfied when the host vehicle has traveled in EV mode for a predetermined amount of time (e.g., several minutes) after a previous update or after the route has been set.

The learning data usage process of S105 uses the learning data accumulated by repeating the process from S115 to S130, and will therefore be described after explaining the energy learning process and the energy efficiency derivation process. Hereinafter, the energy learning process, the energy efficiency derivation process, and the learning data usage process will be explained in order.

(2-1) Energy Learning Processing

Figure 4:
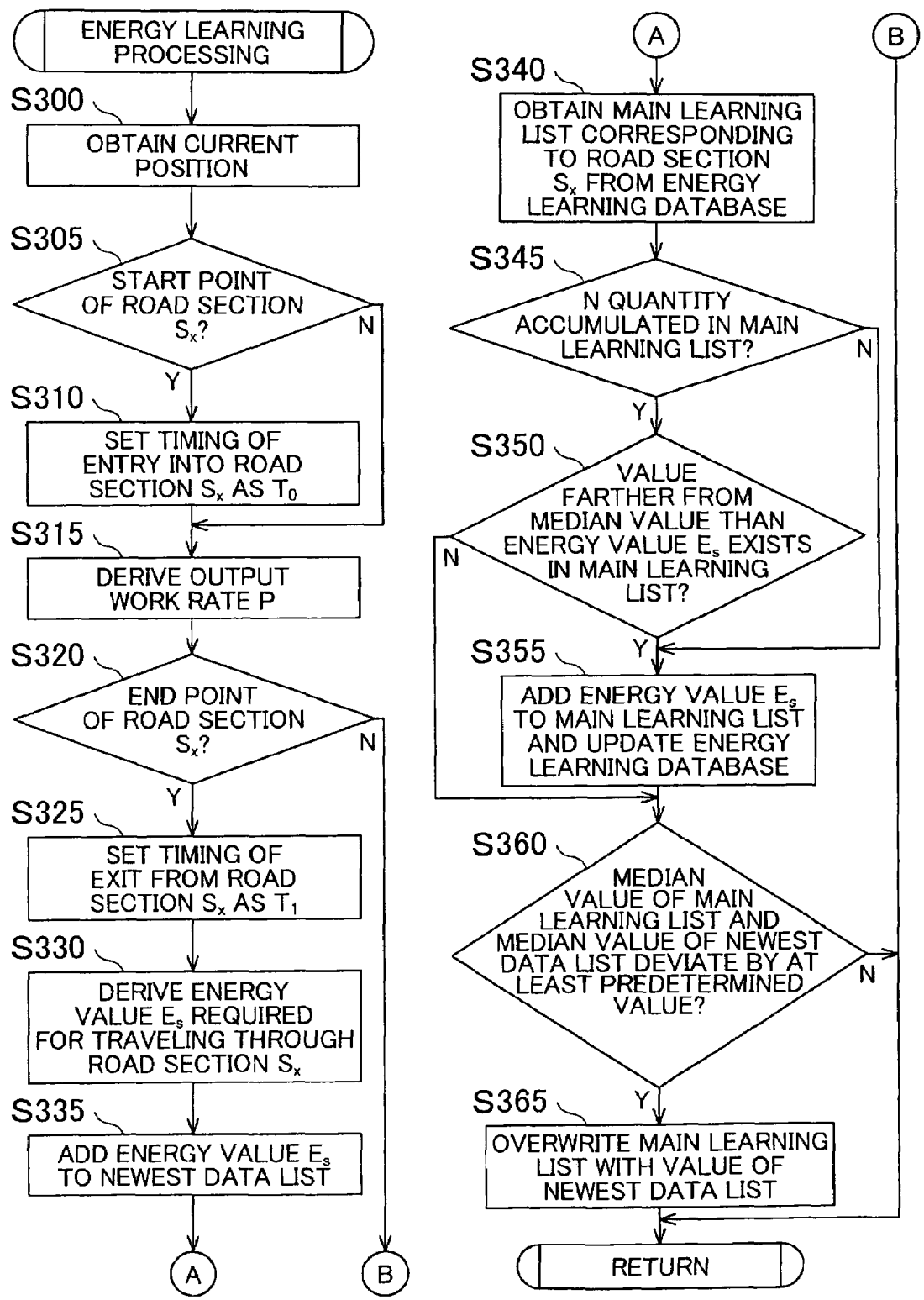
FIG. 4 is a flowchart showing the energy learning process.

The energy learning process at S115 will be explained using a flowchart in FIG. 4. Through the process executed by the road section identifying unit 21a, the control unit 20 first obtains the current position of the host vehicle (S300), and then determines whether the host vehicle has passed the start point of the road section $S_x$ (S305). If it is determined that the host vehicle has passed the start point of the road section $S_x$, then the time at which the host vehicle passed the start point is set as time $T_0$ (S310). Specifically, the control unit 20 determines whether the host vehicle has passed the position of a node or shape interpolating point that corresponds to the start point of the road section $S_x$, and sets the time when the vehicle has passed the start point of the road section Sx as time $T_0$.

Through the process executed by the work rate deriving unit 21b, the control unit 20 next obtains the rotational speed R and the torque T of the transmission shaft 50 at predetermined intervals (e.g. 0.5 seconds), and derives an output work rate P [W] of the transmission shaft 50 using formula (1) below (S315).

[Formula 1]

$$P = R \times T \quad (1)$$

Through the process executed by of the road section identifying unit 21a, the control unit 20 subsequently determines whether the vehicle has passed the end point of the road section $S_x$ (S320). If it is determined that the vehicle has passed the end point of the road section $S_x$, then the time at which the host vehicle passed the end point is set as time $T_1$ (S325). Specifically, the control unit 20 determines whether the host vehicle has passed a node or shape interpolating point that corresponds to the end point of the road section, the start point of which was determined in S305, and sets the time when the host vehicle has passed the end point of the road section $S_x$ as time $T_1$. Through the process executed by the energy information accumulating unit 21c, the control unit 20 then calculates the energy value $E_s$ (output energy of the transmission shaft 50) required for traveling through the road section $S_x$ using formula (2) below (S330). Here, AVG refers to an average value of the work rate value P.

[Formula 2]

$$E_s = \int_{T_0}^{T_1} P \, dt \quad (2)$$
$$= AVG(P) \times (T_1 - T_0)$$

Figure 5A:
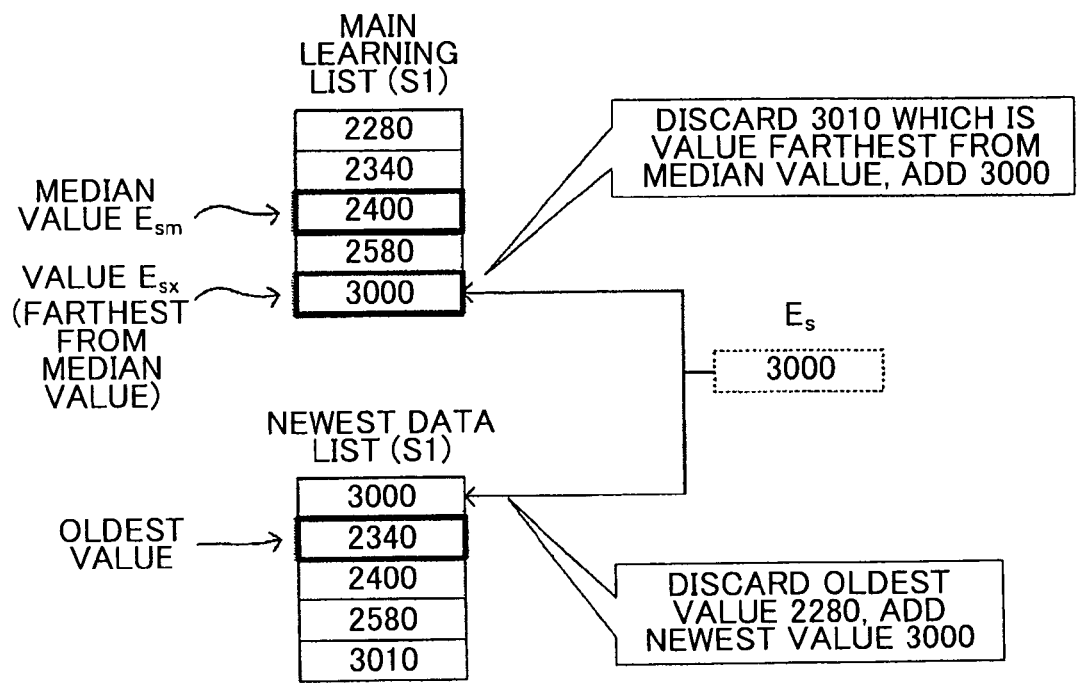
FIGS. 5A and 5B are figures for explaining updating of the main learning list and the newest data list.

Through the process executed by the energy information accumulating unit 21c (the first accumulating unit), the control unit 20 adds the energy value $E_s$ calculated using formula (2) to the newest data list 30b (see S335, FIGS. 2 and 5A). Through the process executed by the energy information accumulating unit 21c (the second accumulating unit), the control unit 20 next obtains the main learning list 30c corresponding to the road section $S_x$ from the energy learning database 30d (S340), and determines whether an N quantity of data linked to the road section $S_x$ is already accumulated (S345). If it is determined that an N quantity of data is already accumulated in the main learning list 30c, then the control unit 20 selects the median value $E_{sm}$ of the N quantity of data to determine whether a value $E_{sx}$, of which the absolute value of the difference between the value $E_{sx}$ and the median value $E_{sm}$ ($|E_{sx}-E_{sx}|$) is greater than the absolute value of the difference between the energy value $E_s$ calculated at S330, and the median value $E_{sm}$ ($|E_s-E_{sm}|$), exists (S350). If the value $E_{sx}$ exists, then the value $E_{sx}$ is discarded from the main learning list 30c and the energy value $E_s$ currently calculated is added to the main learning list 30c (S355), whereby the energy learning database 30d is updated (see FIGS. 2 and 5A). However, if the value $E_{sx}$ does not exist, then the currently calculated energy value $E_s$ is not added to the main learning list 30c corresponding to the road section $S_x$. Accordingly, the energy learning database 30d is not updated.

Figure 5B:
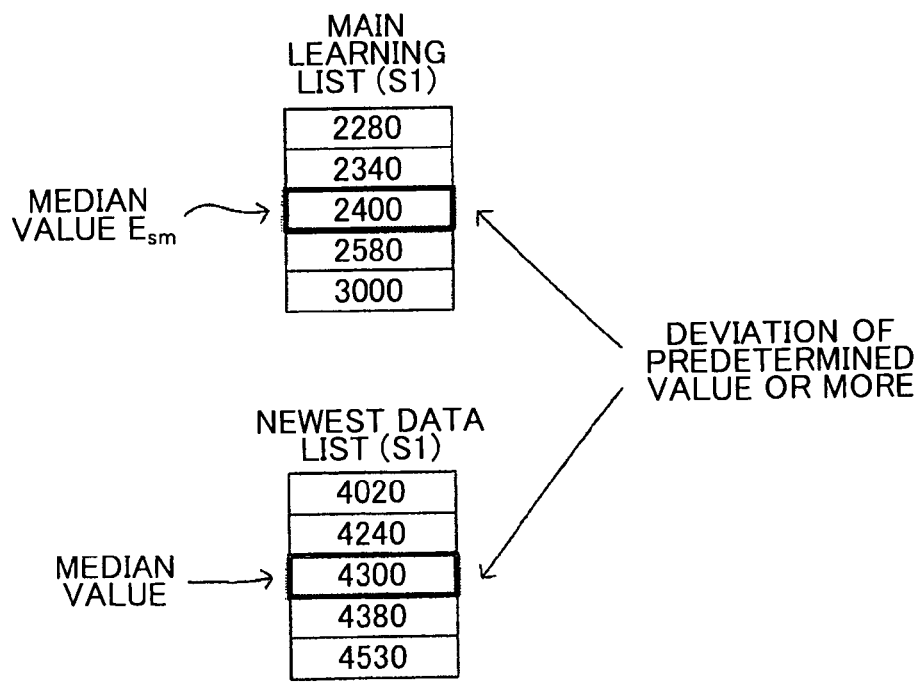

Through the process executed by the energy information accumulating unit 21c (a deviation determining unit), the control unit 20 determines whether the median value $E_{sm}$ of the main learning list 30c linked to the road section $S_x$ and a median value of the newest data list 30b linked to the road section $S_x$ deviate by at least a predetermined value (S360). If the median values deviate by at least the predetermined value, then the main learning list 30c is overwritten with the value of the newest data list 30b (S365) (see FIG. 5B). Thus, by providing the FIFO type newest data list 30b in addition to the main learning list 30c in the present embodiment, non-sporadic (non-noise) characteristic changes of the road section may also be accommodated. For example, if a certain road section is undergoing road work, the road section is likely to be traveled at a lower speed than when road work is not being performed. If the main learning list is created when the road section is undergoing road work, then the energy value derived when the host vehicle travels through the road section after completion of the road work deviate significantly from the energy value already accumulated in the main learning list. As a consequence, energy values for the road section after completion of the road work would always be discarded and the main learning list would not be updated. However, because a FIFO type of newest data list is provided and the main learning list is updated with the content of the newest data list when the median value of the newest data list deviates significantly from the median value of the main learning list, energy values derived after the completion of road work can also be accumulated.

Note that when selecting the median value in the newest data list and the main learning list, if the quantity of energy values already accumulated in the respective lists is an even number, then the two energy values closest to the middle when arranging the energy values in an ascending or descending order are selected, and an average value of the two energy values is adopted as the median value.

(2-2) Energy Efficiency Derivation Processing

Figure 6:
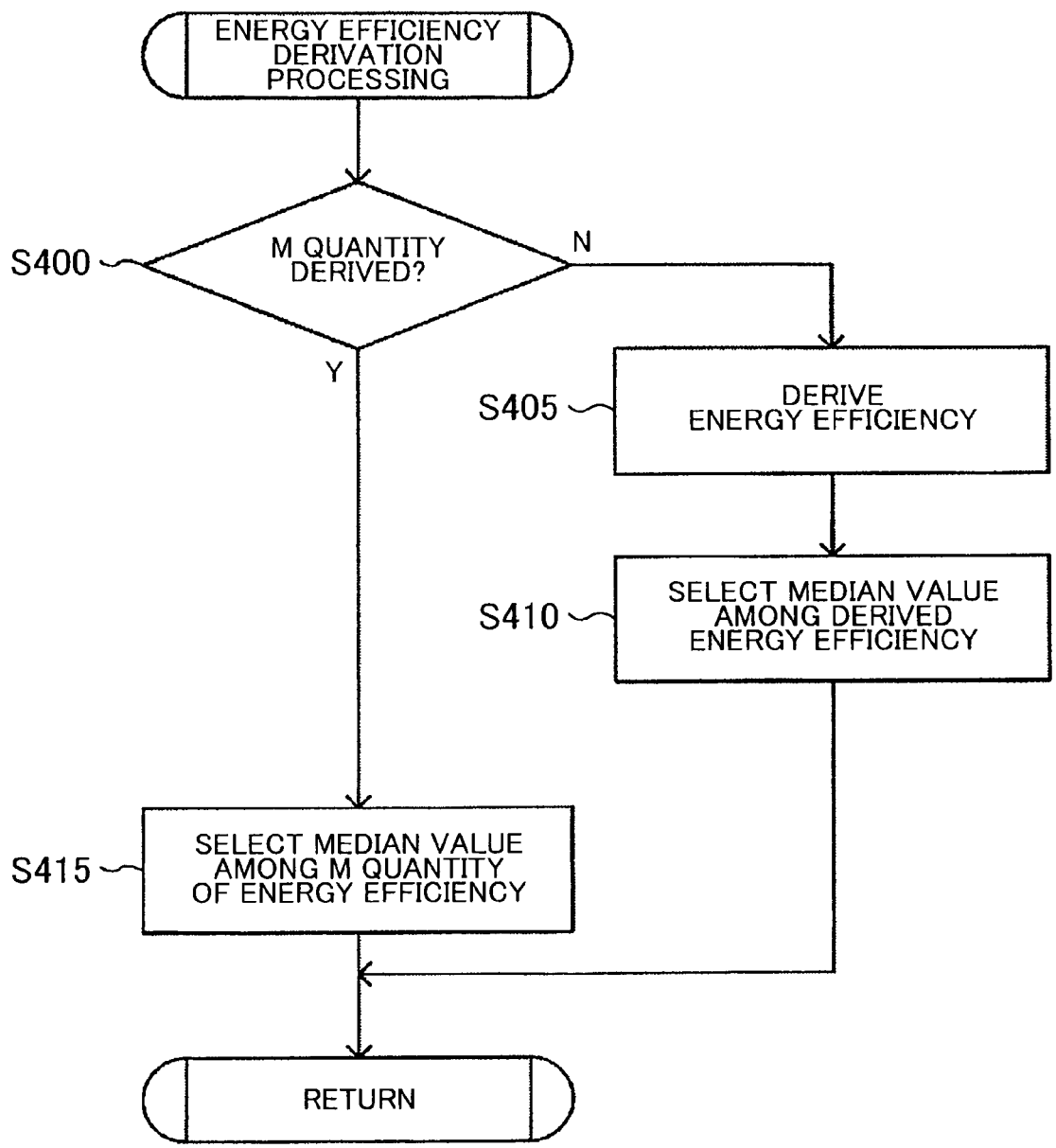
FIG. 6 is a flowchart showing the energy efficiency derivation process.

The energy efficiency derivation process at S125 of FIG. 3 will be explained using a flowchart in FIG. 6. The energy efficiency derivation process is carried out by the energy efficiency deriving unit 21d in the control unit 20, and is executed at predetermined intervals (e.g. every second) when the condition for updating the energy efficiency is satisfied. The control unit 20 first determines whether an M quantity of energy efficiencies has been derived (S400). If an M quantity has not been derived, then the control unit 20 obtains the energy $E_b$ [J] output from a rechargeable battery and the energy $E_s$ [J] output by the transmission shaft 50 during travel that does not use the internal combustion engine. The control unit 20 then calculates an energy efficiency $E_{ef}$ [%] using formula (3) below (S405).

[Formula 3]

$$E_{ef}=(E_s/E_b)\times 100 \qquad (3)$$

The control unit 20 then selects the median value of the derived energy efficiencies, which will be used in the learning data usage process explained next (S410). If it is determined at S400 that an M quantity of energy efficiencies is already derived, then the control unit 20 selects a median value of the M quantity of energy efficiencies. The selected median value is then used in the learning data usage process (S415).

(2-3) Learning Data Usage Processing

Figure 7:
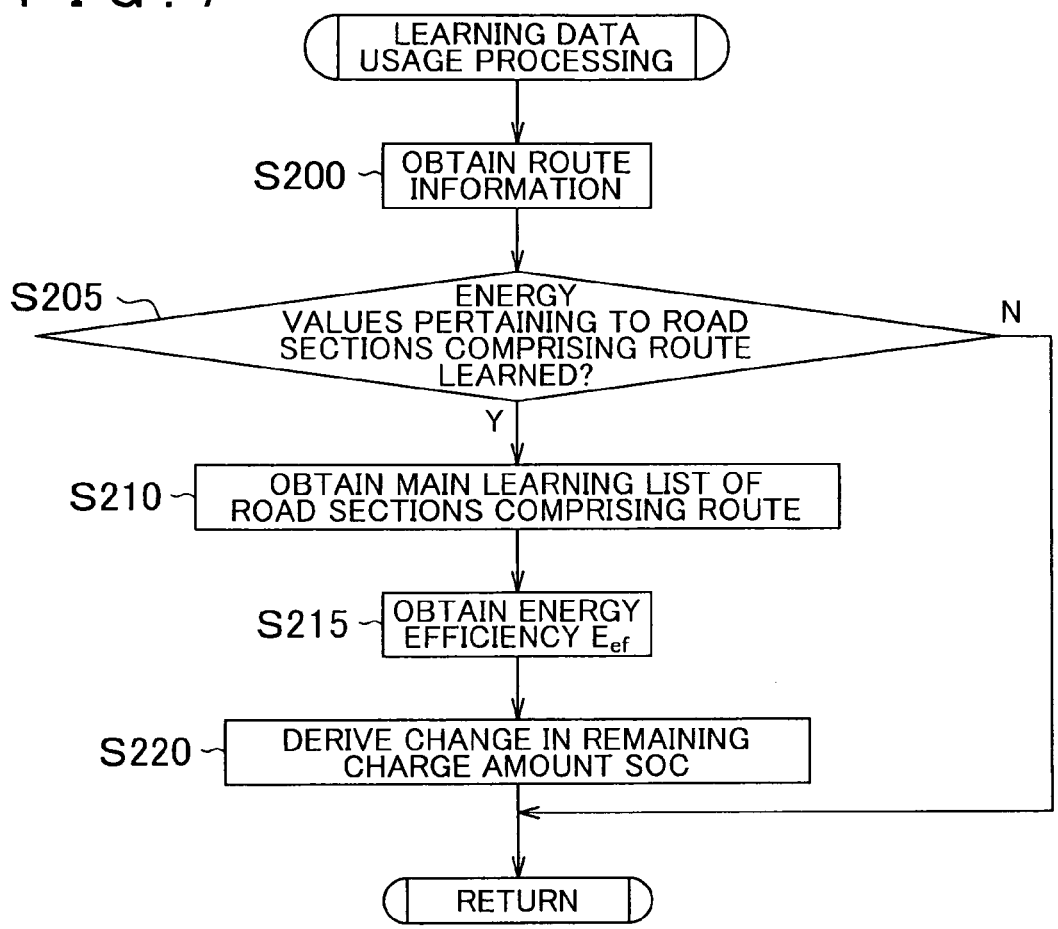
FIG. 7 is a flowchart showing learning data usage process.

FIG. 7 is a flowchart showing the learning data usage process. Through the processing executed by the route information obtaining unit 21f, the control unit 20 first obtains the route information (S200). Through the process executed by the electric power consumption deriving unit 21e, the control unit 20 next determines whether energy values pertaining to each road section comprising the route has been learned (S205). Specifically, the control unit 20 determines whether the corresponding energy value for each road section of the route is accumulated in the main learning lists 30c. An N quantity of energy values need not be accumulated in the main learning lists 30c linked to the road sections, and even the accumulation of one energy value is acceptable. If no energy values pertaining to the plurality of road sections that comprise the route have been learned, then the learning data usage process ends.

If it is determined at S205 that energy values have been learned, then through the process executed by the electric power consumption deriving unit 21e, the control unit 20 obtains the main learning lists linked to the plurality of road sections that comprise the route from the energy learning database 30d (S210). With regard to all the road sections that comprise the route, the control unit 20 obtains the energy efficiency for each road section from the main learning lists (S215). Specifically, the control unit 20 selects the median value of the energy efficiencies derived through the energy efficiency derivation process shown in FIG. 6.

Through the process executed by the electric power consumption deriving unit 21e, the control unit 20 next derives a change in the remaining charge amount SOC (S220). Specifically, the control unit 20 refers to the main learning lists 30c linked to the road sections that comprise the route obtained at S210, and selects a value equivalent to the median value $E_{sm}$ among the energy values accumulated in the respective main learning lists 30c. When deriving the electric power consumption in this manner, the median value of a plurality of energy values learned from the host vehicle traveling through the specific road section several times. Thus, compared to a configuration that uses an average value of information that indicates past energy values accumulated a plurality of times and a configuration that always uses information that indicates the newest energy value, the effects of sporadic large changes in values are minimized so that the electric power consumption may be accurately derived.

The control unit 20 next obtains the current SOC from the drive control ECU 51. Using the energy efficiency $E_{ef}$, the energy value $E_{sm}$, and an energy E [J] per 1% when the maximum charge is 100%, the electric power consumption $Q_b$ [%] for the road section $S_x$ is calculated using formula (4) below.

[Formula 4]

$$Q_b=E_{sm}/(E\times E_{ef}) \qquad (4)$$

Figure 8:
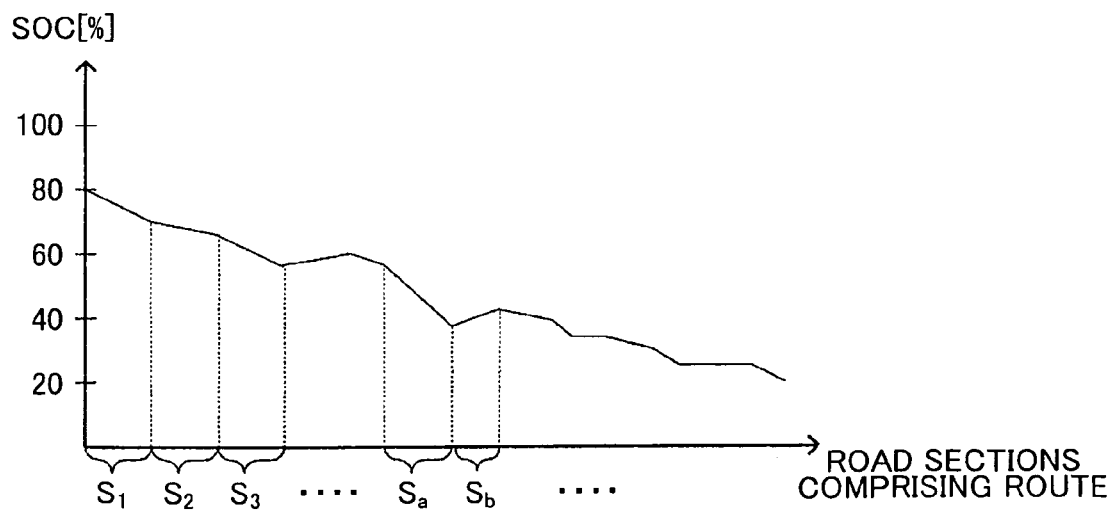
FIG. 8 is a graph for explaining an example of a changes in the remaining amount of charge.

Repeating the calculation of formula (5) for each road section $S_x$ that comprises the route in sequence makes it possible to derive the change in the remaining charge amount SOC [%] as shown in FIG. 8. Note that the phrase "SOC at end of travel in road section $S_x$" refers the remaining charge amount after traveling from the departure point of the route to the end point of the road section $S_x$. Similarly, the meaning of the phrase "SOC at end of travel in road section $S_{x-1}$" refers the remaining charge amount after traveling from the departure point of the route to the end point of the road section $S_{x-1}$.

[Formula 5]

$$\text{SOC at end of travel in road section } S_x = \text{SOC at end of travel in road section } S_{x-1} - Q_b \text{ for road section } S_x \qquad (5)$$

Further note that sections where the SOC is increasing, such as a road section $S_b$ in FIG. 8, the torque value output from the power information collecting ECU 43 is a negative value, i.e., energy is being regenerated as the host vehicle travels through the road section.

As described above, the present embodiment has a configuration in which the actual output work rate value of the transmission shaft 50 is derived based on the rotational speed and the torque transmitted by the transmission shaft 50, and the energy value required to travel through the road section $S_x$ is derived based on the work rate. Therefore, the energy required to travel through the road section may be derived more accurately compared to a configuration that calculates the required output energy using a travel speed pattern, road grade, road friction coefficient, vehicle weight, air resistance, or the like. Furthermore, in the configuration according to the present embodiment, the energy required to travel through a road section is linked to the particular road section and accumulated, and the amount of accumulated energy values may be limited to an N number of data accumulated in the main learning list. Thus, increases in the amount of the accumulated data may be better suppressed compared to a configuration that, for example, maintains each accumulated work rate that has been derived.

According to the present embodiment, the combination of road sections for which energy values are accumulated with respect to a particular route enables prediction of the change in the electric power consumption when the host vehicle travels the route in EV mode only. Consequently, it is possible to predict the maximum distance that the host vehicle can travel in EV mode alone on the way to the destination, for example. In addition, other possible applications include scheduling such that the internal combustion engine is utilized to travel through sections along the set route where electric power consumption will be high, such as a road section $S_a$ in FIG. 8, and/or scheduling such that charging by regenerative energy is carried out in road sections where the remaining charge amount increases, such as the road section $S_b$. In the embodiment, the energy information accumulating unit may accumulate a plurality of information that indicates energy from the host vehicle traveling through the specific road section several times, and in such case, the electric power consumption deriving unit may use a median value of the accumulated plurality of information to calculate the electric power consumption. According to this embodiment of the present invention, in contrast to configurations that use an average value of past information that indicates energy accumulated a plurality of times or configurations that always use the newest information that indicates energy, the effect of sporadic large differences in values is minimized so that a highly accurate derivation of power consumption is possible.

In the embodiment, the energy information accumulating unit include the first accumulating unit, the second accumulating unit, and the deviation determining unit. Controls by the first accumulating unit, the second accumulating unit, and the deviation determining unit may be executed to accumulate information that indicates energy required for traveling the road section, based on the work rate derived while traveling through the particular road section. The information that indicates energy accumulated in the first accumulating unit may be accumulated separately from the information that indicates energy accumulated in the second accumulating unit.

Namely, the first accumulating unit links the information that indicates energy required for current travel to the road section and accumulates such information if the accumulated quantity of information that indicates energy required for traveling the road section linked to a currently traveled road section in the first accumulating unit is below a predetermined quantity. Meanwhile, if the accumulated quantity of information that indicates energy required for traveling the road section linked to the currently traveled road section and already accumulated by the first accumulating unit has reached the predetermined quantity, the first accumulating unit links the information that indicates energy required for current travel to the road section and accumulates such information. The first accumulating unit discards the oldest information that indicates energy required to travel the road section that is linked to the road section and already accumulated by the first accumulating unit.

The second accumulating unit links the information that indicates energy required for current travel to the road section and accumulates such information if the accumulated quantity of information that indicates energy required for traveling the road section linked to a currently traveled road section in the second accumulating unit is below a predetermined quantity. Meanwhile, if the accumulated quantity of information that indicates energy linked to the currently traveled road section that is accumulated by the second accumulating unit has reached the predetermined quantity, the second accumulating unit accumulates the predetermined quantity of information that indicates energy, and also excludes information that indicates energy that has a largest absolute value with respect to the difference of the information that indicates energy required among the predetemined quantity of information that indicates energy already accumulated by the second accumulating unit and the information that indicates energy required for current travel, with a median value of the predetemined quantity of information that indicates energy already accumulated by the second accumulating unit.

The deviation determining unit determines whether the median value of the information that indicates energy linked to the currently traveled road section and accumulated in the first accumulating unit deviates from the median value of the information that indicates energy linked to the road section and accumulated in the second accumulating unit by at least a predetermined value. If there is deviation by at least the predetermined value, then the information that indicates energy accumulated in the second accumulating unit is updated based on the information that indicates energy accumulated in the first accumulating unit.

If the energy information accumulating unit is configured as described above, the electric power consumption deriving unit uses the median value of the information that indicates energy accumulated in the second accumulating unit to derive the electric power consumption.

As described above, in the energy information accumulating unit, information that indicates energy required for traveling the road section is accumulated according to different systems, as with the first accumulating unit and the second accumulating unit. If the deviation determining unit determines that the median value of the information that indicates energy linked to the currently traveled road section and accumulated in the first accumulating unit deviates from the median value of the information that indicates energy linked to the road section and accumulated in the second accumulating unit by at least a predetermined value, the deviation determining unit updates the information that indicates energy required for traveling the road section in the second accumulating unit. And the electric power consumption deriving unit uses the median value of the information that indicates energy required for traveling the road section in the second accumulating unit to derive the electric power consumption. Thus, the effects of sporadic large changes in values may be reduced and non-sporadic characteristic changes of the road section may also be accommodated.

If, when selecting the median value, the accumulated quantity is an even number, then an average value of the two values closest to the middle among the accumulated information that indicates energy may be adopted as the median value.

In the embodiment, the route information obtaining unit obtains the route of the host vehicle to a destination. In this embodiment, the electric power consumption deriving unit may derive the change in the electric power consumption of the motor, based on the accumulated information that indicates energy required for traveling the road section respectively linked to a plurality of road sections that comprise the route, assuming the host vehicle uses only the driving force generated by the motor in traveling the route. According to this embodiment, the combination of road sections for which information that indicates energy is accumulated with respect to an particular route is used to predict the change in the electric power consumption when the host vehicle travels the route in EV mode. Consequently, it is possible to predict the maximum distance that can be traveled in EV mode only on the way to the destination. In addition, other applications include scheduling such that the internal combustion engine is utilized to travel through sections with large electric power consumption along the route.

(3) Other Embodiments

The embodiment described above is only an illustrative example of the present invention. Various other embodiments may be adopted, provided that information that indicates a work rate of a transmission shaft, which transmits a driving force from a drive source of a host vehicle to a wheel, is derived based on a rotational speed and a torque of the transmission shaft, and provided that information that indicates energy required for traveling through an applicable road section is linked to the road section and accumulated based on the information that indicates the work rate.

For example, the embodiment is described in the context of a hybrid vehicle, as the "host vehicle", which is equipped with a motor that serves as a drive source. In the case of a hybrid vehicle, the energy efficiency deriving unit derives the energy efficiency when an internal combustion engine is not used to provide drive power to the vehicle. According to the described configuration, it is possible to determine the electric power consumed per road section provided that the host vehicle is traveling using only the driving force generated by the motor (referred to as "traveling in EV mode" below). The embodiment may also be applied to an electric vehicle or the like.

The road section to which the energy value is linked and which is accumulated is not particularly limited to road sections that are divided by nodes, shape interpolating points, grade changes, and the like in map information; road sections partitioned at arbitrary distance intervals or a combination thereof may also be acceptable. Any suitably determined road section may be used, provided that a start point and an end point, as well as a road therebetween can be uniquely identified.

In a front-engine front-wheel-drive vehicle, for example, the work rate of the right and left drive shafts are calculated and the sum of the work rates of the right and left drive shafts is output from the power information collecting ECU 43.

What is claimed is:

1. A travel energy learning device comprising:
   a road section identifying unit that identifies a road section where a host vehicle is currently located, the host vehicle including an internal combustion engine and a motor;
   a work rate information deriving unit that derives a work rate of a transmission shaft based on a rotational speed of the transmission shaft and a torque transmitted by the transmission shaft, the transmission shaft being configured to transmit a driving force from the internal combustion engine and the motor to a wheel of the host vehicle; and
   an energy information accumulating unit that derives information that indicates the energy required for traveling the road section based on the derived work rate during travel of the host vehicle through the road section, links the derived information that indicates the energy required for traveling the road section to the road section, and accumulates the information that indicates the energy required for traveling the road section;
   wherein:
     the energy information accumulating unit accumulates plurality of information that indicates the derived energy required for traveling the specific road section, responsive to a plurality of travels by the host vehicle on the specific road section;
     the energy information accumulating unit comprises a first accumulating unit, a second accumulating unit, and a deviation determining unit;
     the first accumulating unit:
       links the information that indicates energy required for current travel to the road section and accumulates such information if an accumulated quantity of information that indicates energy linked to a currently traveled road section and already accumulated by the first accumulating unit is below a predetermined quantity; and
       links the information that indicates energy required for current travel to the road section and accumulates such information, and also discards the information that indicates the energy required for traveling the road section that corresponds to the oldest traveled road section accumulated by the first accumulating unit if the accumulated quantity of information that indicates energy linked to the currently traveled road section accumulated by the first accumulating unit has reached the predetermined quantity;
     the second accumulating unit:
       links the information that indicates energy required for current travel to the road section and accumulates such information if an accumulated quantity of information that indicates energy linked to the currently traveled road section and already accumulated by the second accumulating unit is below a predetermined quantity; and
       links the predetermined quantity of information that indicates energy to the road section and accumulates such information, and also excludes information that indicates energy that has a largest absolute value with respect to the difference of the information that indicates energy required among the predetermined quantity of information that indicates energy already accumulated by the second accumulating unit and the information that indicates energy required for current travel, with a median value of the predetermined quantity of information that indicates energy already accumulated by the second accumulating unit, if the accumulated quantity of information that indicates energy linked to the currently traveled road section and already accumulated by the second accumulating unit has reached the predetermined quantity; and
     the deviation determining unit determines whether the median value of the information that indicates the energy required for traveling the road section linked to the currently traveled road section that is accumulated in the first accumulating unit deviates from the median value of the information that indicates the energy required for traveling the road section linked to the road section that is accumulated in the second accumulating unit by at least a predetermined value, wherein if there is deviation by at least the predetermined value, then the information that indicates the energy required for traveling the road section accumulated in the second accumulating unit is overwritten with the information that indicates the energy required for traveling the road section accumulated in the first accumulating unit.

2. The travel energy learning device according to claim 1, further comprising:
   an energy efficiency deriving unit that derives an energy efficiency of the host vehicle, which is the ratio of energy output by the transmission shaft with respect to energy output from the motor, when the host vehicle travels using only driving force generated by a motor; and
   an electric power consumption deriving unit derives the electric power consumption of the motor based on the derived energy efficiency and the accumulated information that indicates the energy required for traveling the road section, and which is linked to the road section when the host vehicle is traveling through the road section using only the driving force generated by the motor, the electric power consumption deriving unit using the median value of the information that indicates the energy required for traveling the road section accumulated in the second accumulating unit to derive the electric power consumption.

3. The travel energy learning device according to claim 2, further comprising:
a route information obtaining unit that obtains a route from a departure point to a destination;
wherein the electric power consumption deriving unit that derives changes in electric power consumption of the motor in traveling the route based on the accumulated information indicates the energy required for traveling the road section respectively linked to a plurality of road sections that comprise the route.

4. A travel energy learning method comprising:
identifying a road section where a host vehicle is currently located, the host vehicle including an internal combustion engine and a motor;
deriving a work rate of a transmission shaft based on a rotational speed of the transmission shaft and a torque transmitted by the transmission shaft, the transmission shaft being configured to transmit a driving force from the internal combustion engine and the motor to a wheel of the host vehicle;
deriving information that indicates the energy required for traveling the road section based on the derived work rate during travel of the host vehicle through the road section;
linking the derived information that indicates the energy required for traveling the road section to the road section and accumulating the linked information;
accumulating plurality of information that indicates the derived energy required for traveling the specific road section, responsive to a plurality of travels by the host vehicle on the specific road section;
with a first accumulating unit:
  linking the information that indicates energy required for current travel to the road section and accumulates such information if an accumulated quantity of information that indicates energy linked to a currently traveled road section and already accumulated by the first accumulating unit is below a predetermined quantity;
  linking the information that indicates energy required for current travel to the road section and accumulates such information, and also discarding the information that indicates the energy required for traveling the road section that corresponds to the oldest accumulated traveled road section if the accumulated quantity of information that indicates energy linked to the currently traveled road section has reached the predetermined quantity;
with a second accumulating unit:
  linking the information that indicates energy required for current travel to the road section and accumulates such information if an accumulated quantity of information that indicates energy linked to the currently traveled road section and already accumulated is below a predetermined quantity; and
  linking the predetermined quantity of information that indicates energy to the road section and accumulates such information, and also excluding information that indicates energy that has a largest absolute value with respect to the difference of the information that indicates energy required among the predetermined quantity of information that indicates energy already accumulated and the information that indicates energy required for current travel, with a median value of the predetermined quantity of information that indicates energy already accumulated, if the accumulated quantity of information that indicates energy linked to the currently traveled road section and already accumulated has reached the predetermined quantity;
determining whether the median value of the information that indicates the energy required for traveling the road section linked to the currently traveled road section that is accumulated in the first accumulating unit deviates from the median value of the information that indicates the energy required for traveling the road section linked to the road section that is accumulated in the second accumulating unit by at least a predetermined value; and
if there is deviation by at least the predetermined value, overwriting the information that indicates the energy required for traveling the road section accumulated in the second accumulating unit with the information that indicates the energy required for traveling the road section accumulated in the first accumulating unit.

5. A non-transitory computer-readable storage medium storing a computer-executable travel energy learning program, the program comprising:
instructions for identifying a road section where a host vehicle is currently located, the host vehicle including an internal combustion engine and a motor;
instructions for deriving a work rate of a transmission shaft based on a rotational speed of the transmission shaft and a torque transmitted by the transmission shaft, the transmission shaft being configured to transmit a driving force from the internal combustion engine and the motor to a wheel of the host vehicle;
instructions for deriving information that indicates the energy required for traveling the road section based on the derived work rate during travel of the host vehicle through the road section;
instructions for linking the derived information that indicates the energy required for traveling the road section to the road section and accumulating the linked information;
instructions for accumulating plurality of information that indicates the derived energy required for traveling the specific road section, responsive to a plurality of travels by the host vehicle on the specific road section;
instructions for, with a first accumulating unit:
  linking the information that indicates energy required for current travel to the road section and accumulates such information if an accumulated quantity of information that indicates energy linked to a currently traveled road section and already accumulated by the first accumulating unit is below a predetermined quantity;
  linking the information that indicates energy required for current travel to the road section and accumulates such information, and also discarding the information that indicates the energy required for traveling the road section that corresponds to the oldest accumulated traveled road section if the accumulated quantity of information that indicates energy linked to the currently traveled road section has reached the predetermined quantity;
instructions for, with a second accumulating unit:
  linking the information that indicates energy required for current travel to the road section and accumulates such information if an accumulated quantity of information that indicates energy linked to the currently traveled road section and already accumulated is below a predetermined quantity; and
  linking the predetermined quantity of information that indicates energy to the road section and accumulates such information, and also excluding information that indicates energy that has a largest absolute value with respect to the difference of the information that indicates energy required among the predetermined quantity of information that indicates energy already accumulated and the information that indicates energy required for current travel, with a median value of the predetermined quantity of information that indicates energy already accumulated, if the accumulated quantity of information that indicates energy linked to the currently traveled road section and already accumulated has reached the predetermined quantity;

instructions for determining whether the median value of the information that indicates the energy required for traveling the road section linked to the currently traveled road section that is accumulated in the first accumulating unit deviates from the median value of the information that indicates the energy required for traveling the road section linked to the road section that is accumulated in the second accumulating unit by at least a predetermined value; and instructions for, if there is deviation by at least the predetermined value, overwriting the information that indicates the energy required for traveling the road section accumulated in the second accumulating unit with the information that indicates the energy required for traveling the road section accumulated in the first accumulating unit.

* * * * *